United States Patent [19]
Jones

[11] 3,995,251
[45] Nov. 30, 1976

[54] BOAT LAUNCHING ALERT DEVICE

[75] Inventor: Eugene D. Jones, Longview, Wash.

[73] Assignee: The Raymond Lee Organization, Inc., New York, N.Y.

[22] Filed: Mar. 9, 1976

[21] Appl. No.: 665,190

[52] U.S. Cl. .............................. 340/59; 340/244 B; 116/118 R
[51] Int. Cl.² ........................................ G08B 21/00
[58] Field of Search ............. 340/52 R, 59, 70, 235, 340/236, 244 A, 244 B, 244 D, 244 R; 116/118 R

[56] References Cited
UNITED STATES PATENTS

| 3,585,582 | 6/1971 | Dove | 340/52 R |
| 3,821,699 | 6/1974 | Marus et al. | 340/59 |

*Primary Examiner*—Alvin H. Waring
*Attorney, Agent, or Firm*—Stephen Wyden

[57] ABSTRACT

A pivotally mounted float that moves when a trailer contacts water causing the closing of a pair of electrical contacts causing a horn to sound when a car is being driven in reverse.

2 Claims, 3 Drawing Figures

BOAT LAUNCHING ALERT DEVICE

I have invented a new and novel device to warn the driver of a car with a boat trailer that the boat is far enough into the water to stop the car and complete the launching of the boat.

My invention can be understood in view of the accompanying figures.

Figure 1:
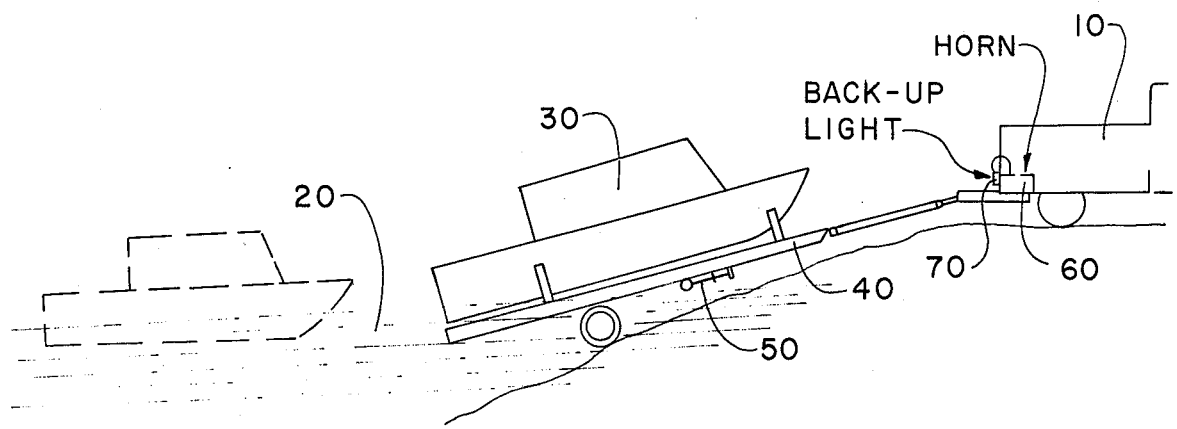
FIG. 1 shows the device in use.

In FIG. 1, a pick-up truck (10) has pulled up to the edge of the water (20) with a boat (30) on a trailer (40). As the trailer (40) moves out into the water (20) the boat (30) lifts off the trailer (40) activating the alert mechanism (50) which in turn activates a horn (60) connected to the backup lights (70).

Figure 2:
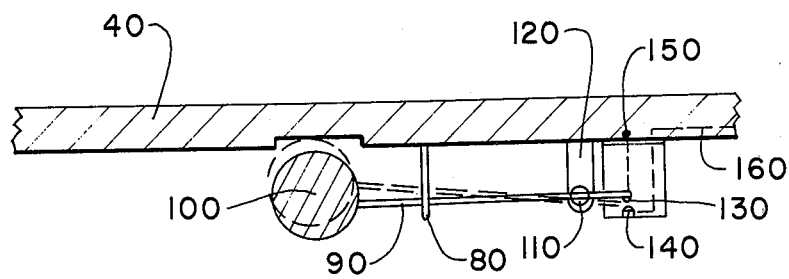
FIG. 2 is a portion of the trailer showing the alert before the boat has entered the water far enough to be launched.
Figure 3:
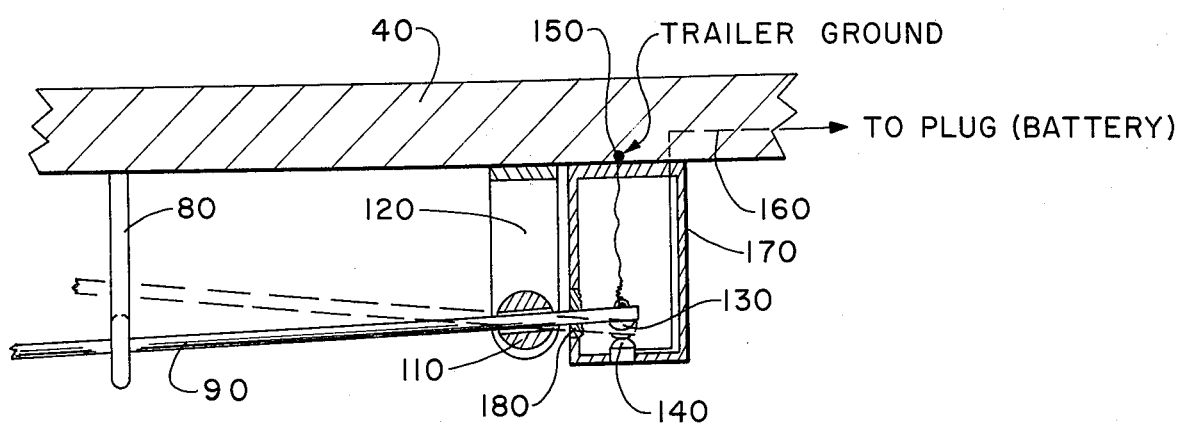
FIG. 3 shows a detail of the device when the boat is in the launching position.

In FIGS. 2 and 3 the alert mechanism (50) of FIG. 1 consists of attaching to the trailer (40) a float rest (80) on which, normally, a rocker arm (90) rests supporting a float (100) seen in FIG. 2, at the end of the rocker arm (90). The rocker arm is supported and pivots (110) on a support member (120) which permits the electrical contact (130) on the distal end of the rocker arm (90) to touch a fixed contact (140) closing the electrical circuit between the ground in the trailer (150) and a line cord (160) that is connected to a plug connected to the battery of the car. The rocker arm (90) moves when the float (100) is lifted up by contacting water as the trailer slides into the water. Closing the circuit activates a horn (60) in FIG. 1 which is connected to the car battery preferably through the circuit that lights up the back up lights (70) of FIG. 1 when arriving in reverse. Thus the horn signal (60) in FIG. 1 can only be activated and heard when driving in reverse, preventing accidental sounding of the alert signal while driving.

In FIG. 3, the contacts (130) and (140) are seen to be in a sealed chamber (170) with a flexible seal (180) around the rocker arm (90) to permit movement of the arm (90) without permitting water to touch the contacts (130) and (140).

Having described a preferred embodiment of my invention, it is understood that various changes can be made without departing from the spirit of my invention, and, I desire to cover by the appended claims all such modifications as fall within the true spirit and scope of my invention.

What I claim and seek to secure by Letters Patent is:
1. A boat launching alert device, comprising:
a boat trailer,
a support member (120) attached to the trailer,
a rocker arm pivotally attached to the support member,
a float rest (80) attached to the trailer and supporting the rocker arm when in the normally resting position
a float (100) attached to an end of the rocker arm,
an electrical contact (130) attached to a distal end of the rocker arm,
a sealable chamber (170) attached to the trailer and surrounding the distal end of the rocker arm,
a fixed contact mounted in the sealable chamber, whereby the electrical contact may contact the fixed contact when rotated by the lifting of the float caused by contact between the float and water,
a flexible seal surrounding the portion of the distal end of the rocker arm that enters the sealable chamber, thereby sealing the chamber and keeping out water from contacting the contacts, and
a horn connected through an electrical circuit to the contacts whereby the horn will sound off when the trailer enters the water causing the lifting of the float.
2. The electrical circuit of claim 1, comprising:
a ground connected to the trailer and connected to the fixed contact,
a line connecting the electrical contact to the horn, and
the horn connected to a back up light of a car, whereby the alert can be activated only when the car is driven in reverse preventing accidental discharge of the horn.

* * * * *